Patented Dec. 12, 1950

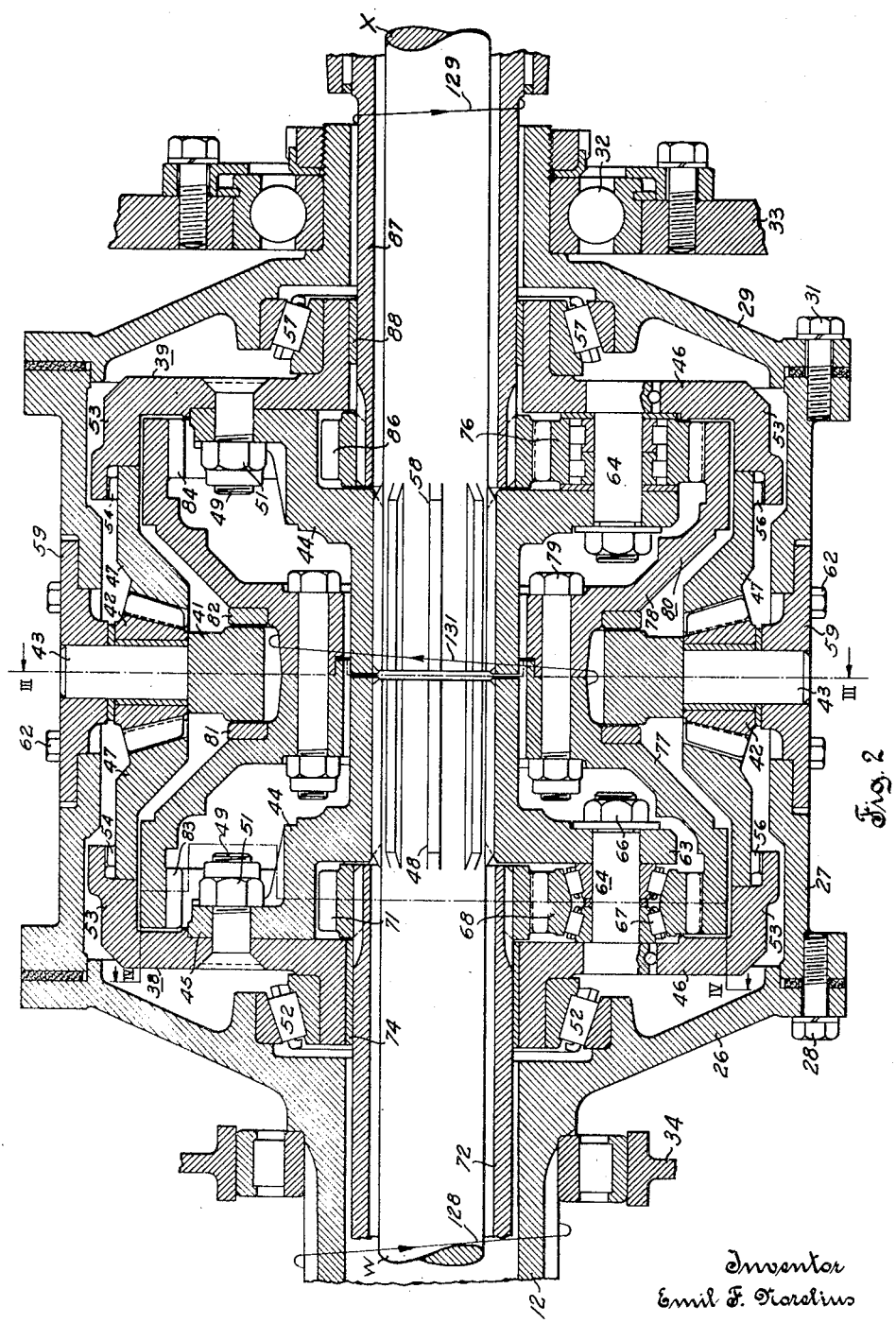

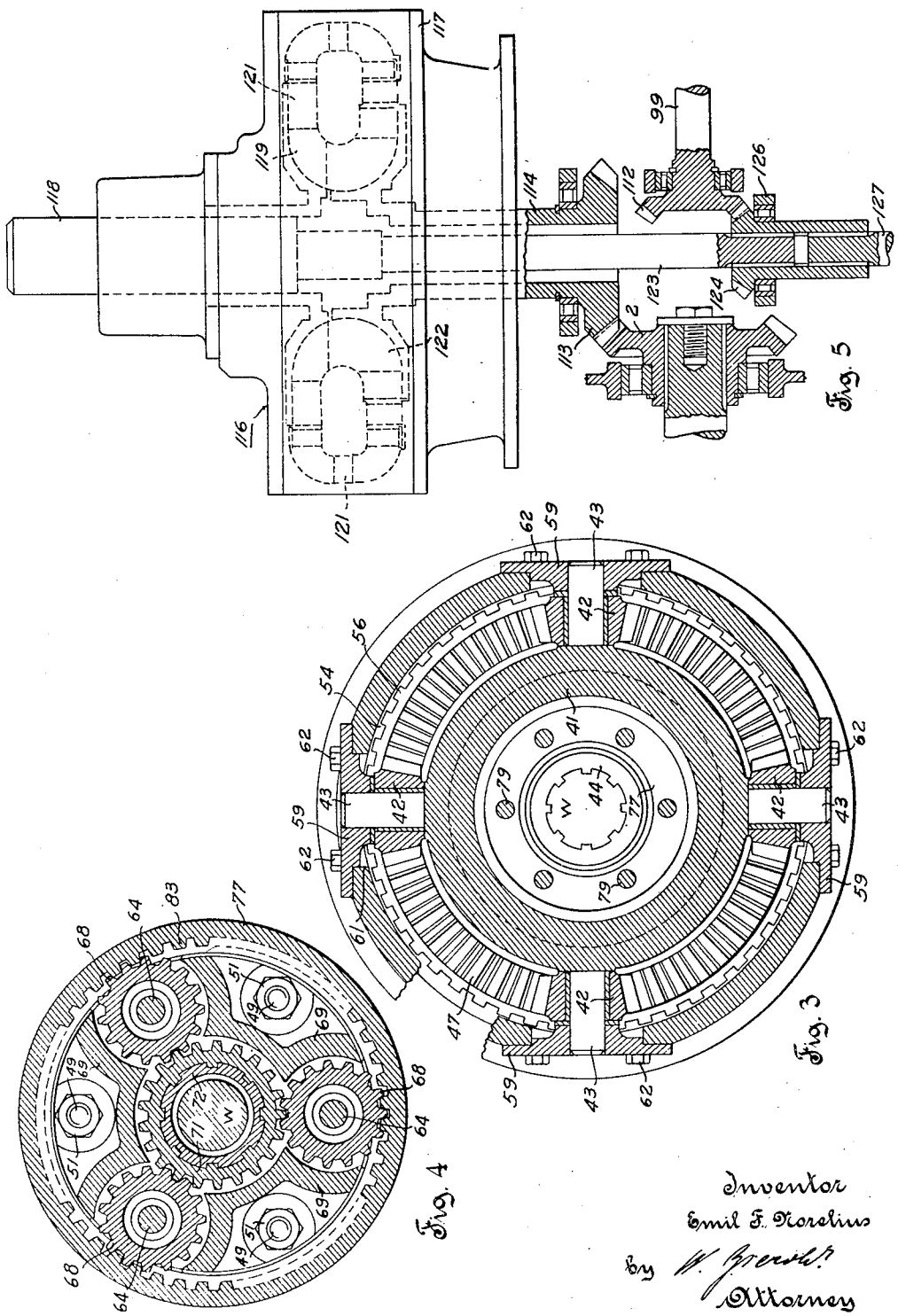

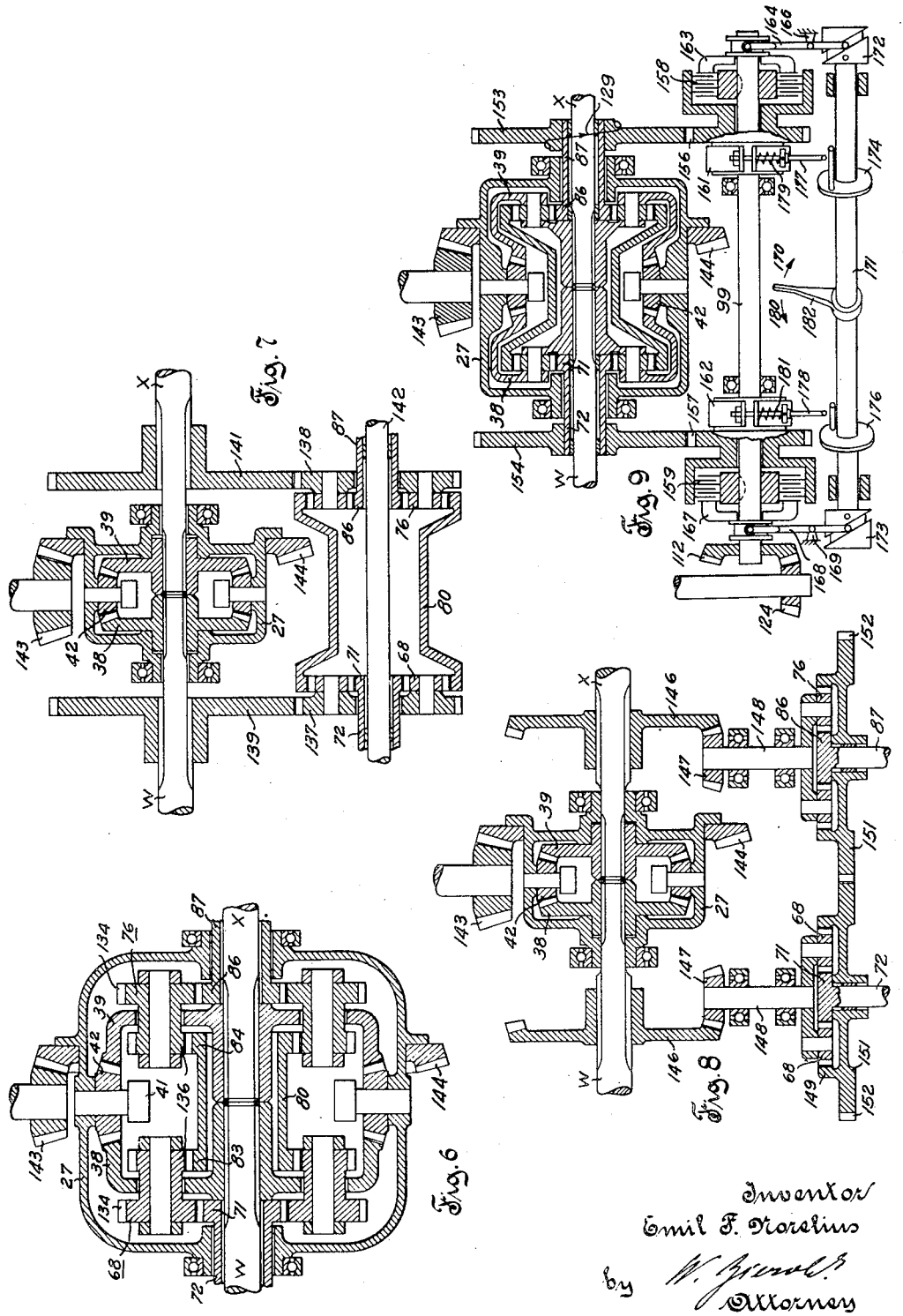

2,533,611

UNITED STATES PATENT OFFICE 2,533,611

CONTROLLED DIFFERENTIAL TRANSMISSION MECHANISM

Emil F. Norelius, Springfield, Ill., assignor to Allis-Chalmers Manufacturing Company, Milwaukee, Wis., a corporation of Delaware Application December 28, 1946, Serial No. 719,062

25 Claims. (Cl. 74—710.5)

This invention relates, in general, to power transmitting mechanisms, and it is concerned more particularly with a drive mechanism for a pair of relatively rotatable shafts or the like, which is operable to transmit a common driving torque to said shafts and to differentiate the speeds at which the latter are driven by said torque.

The invention contemplates the provision of a mechanism for the stated purpose which utilizes certain basic features which are disclosed and claimed in my copending application Serial No. 642,357, filed on January 19, 1946, for Driving and Steering Mechanism for Motor Vehicles.

Power transmitting mechanisms of the general character outlined hereinbefore have been suggested, particularly for use in motor vehicles such as crawler tractors, which are steered by driving, that is, in which steering is effected by controlling the drive of ground engaging traction devices at opposite sides of the vehicle. According to such earlier suggestions a pair of relatively rotatable driven shafts are connected with each other by a differential mechanism, and driving power is applied to said differential mechanism in two ways, namely, first, by means of a driving shaft which is geared to the spider of the differential mechanism, and second, by means of an auxiliary gearing which is connected in driving relation with the compensating gearing of the differential mechanism and in driven relation with an auxiliary drive element, which may be driven to actuate the auxiliary gearing and thereby impress a differential drive upon the driven shafts.

Generally, it is an object of the invention to provide an improved mechanism of the above stated character which is more satisfactory from an engineering and performance standpoint than those which have heretofore been suggested.

More specifically, it is an object of the invention to provide a power transmitting mechanism of the above mentioned character in which a main differential, an auxiliary planetary gear train, and a planetary type speed changing mechanism are combined to form a compact assembly, the auxiliary planetary gear train and speed changing mechanism being mounted within a rotatable drum or the like, which also encloses the compensating gearing of the main differential and which serves as a spider for the planet pinions of the main differential.

For practical reasons it is generally desirable, and the invention contemplates, to arrange the mechanism in such a manner that the power input element of the auxiliary planetary gear train remains stationary while driving power is applied to the spider of the differential mechanism, and so that driving power may be applied to the auxiliary planetary gear train irrespective of whether the spider of the differential mechanism is rotating or locked against rotation. It is further desirable and the invention contemplates, to arrange the mechanism in such a manner that the auxiliary planetary gear train and the speed changing mechanism will function to lock the compensating gearing of the differential mechanism against compensating action upon locking of the power input element of the planetary gear train, but without restraining the locked compensating gearing against rotation as a whole, so that the driven shafts may be rotated in unison with each other as if they were rigidly connected together.

It is a further object of the invention to provide an improved power transmitting mechanism of the character outlined hereinbefore, in which auxiliary driving power for rotating the driven shafts at differential speeds may be applied selectively either to a component element of the auxiliary planetary gear train or to a component element of the planetary type speed changing mechanism so that, in a motor vehicle for instance, steering to one side may be effected by rotating the component element of the auxiliary planetary gear train in a predetermined direction, and so that steering to the other side may be effected by rotating the component element of the speed changing mechanism in said predetermined direction.

A further object of the invention is to provide an improved power transmitting mechanism of the hereinbefore outlined character in which the compensating gearing of the differential mechanism will be locked against differential action when the mentioned component element of the auxiliary gear train and the mentioned component element of the speed changing mechanism are restrained against rotation and in which the locked compensating gearing of the main differential may rotate as a whole so that the driven or power output shafts may rotate in unison with each other either in a forward or a reverse direction as if they were rigidly connected together.

It is also an object of the present invention to provide an improved modified form of the mechanism disclosed in the mentioned earlier application to the end of simplifying the mechanism and rendering it more desirable from an engineering and manufacturing standpoint.

These and other objects and advantages are attained by the present invention, various novel features of which will be apparent from the description herein and the accompanying drawings disclosing several embodiments of the invention, and will be more particularly pointed out in the accompanying claims.

In the drawings:

Fig. 2 is a sectional view of a compound differential and steering unit incorporated in the mechanism shown in Fig. 1.

Figs. 3 and 4 are further sectional views of the compound differential and steering unit, the view of Fig. 3 being taken on line III—III of Fig. 2, and the view of Fig. 4 being taken on line IV—IV of Fig. 2.

Fig. 5 is a top view of part of the mechanism shown in Fig. 1 and of a hydraulic torque converter arranged in driving relation with the mechanism.

Fig. 6 is a schematic view of a modification of the compound differential and steering unit shown in Fig. 2.

Figs. 7, 8 and 9 are schematic views, respectively, of further modifications of the compound differential and steering unit shown in Fig. 2.

Figure 1:
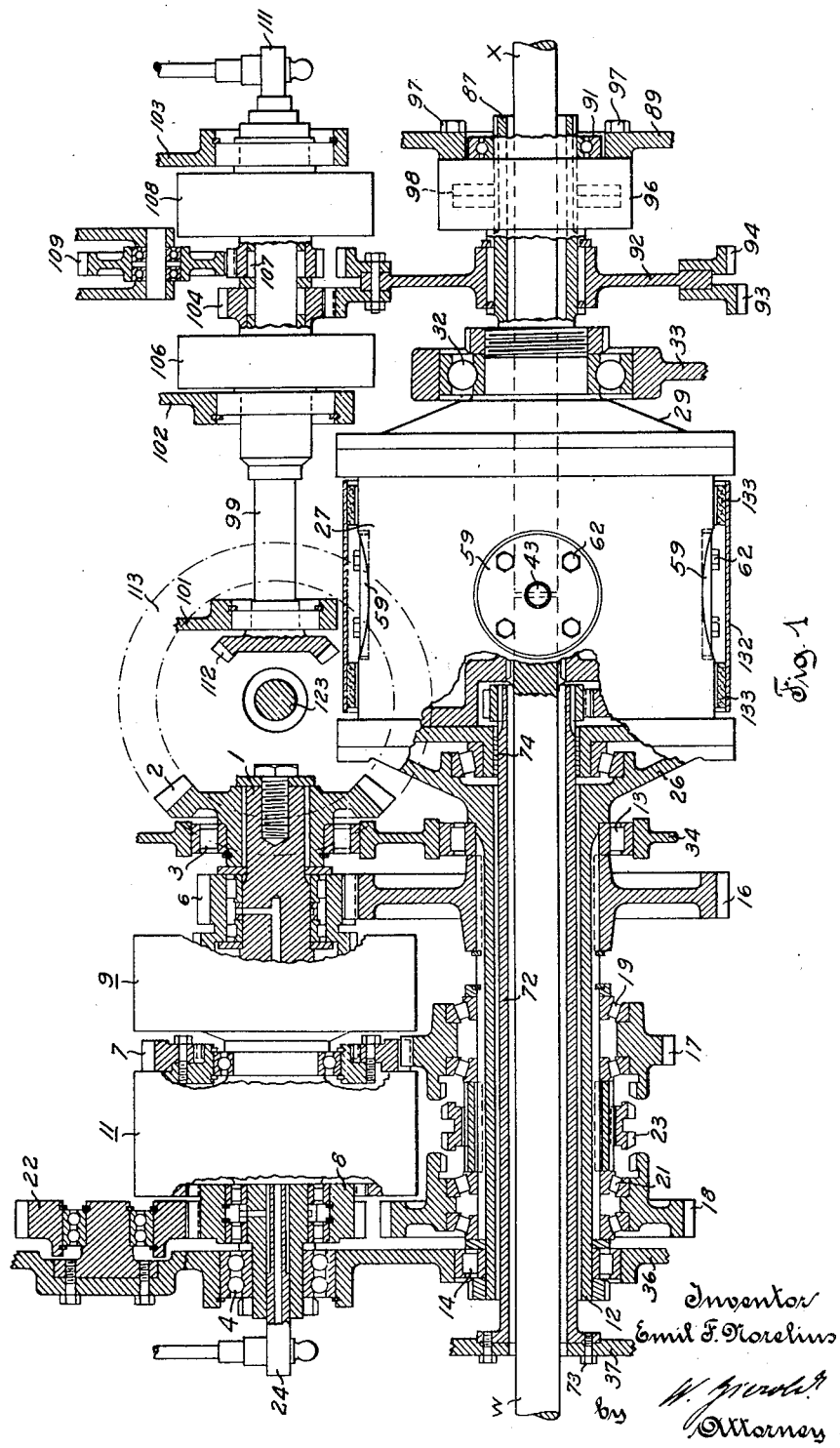
Fig. 1 is a view, partly in section, of a drive mechanism for a motor vehicle, the view being taken in a horizontal direction.

Referring to Fig. 1, the drive mechanism shown in this figure is intended, as stated, for incorporation in a motor vehicle, and it comprises a main power transmitting gearing, part of which is shown in the left half of the figure, for transmitting propelling power to traction devices, not shown, at opposite sides of the vehicle, and an auxiliary power transmitting gearing, part of which is shown in the right half of the figure, for transmitting steering power to the traction devices.

Referring to the gearing which is shown in the left half of Fig. 1, and which constitutes an automotive type change speed transmission affording two forward speeds and one reverse speed, the input shaft of said transmission is indicated by the reference character 1. A bevel gear 2 for applying driving power to the input shaft 1 through a hydraulic torque converter, as will be more fully discussed hereinbelow with reference to Fig. 5, is non-rotatably secured to the input shaft 1 at the right end of the latter. Mounted on the input shaft 1, between bearings 3 and 4, are a low speed gear 6, a high speed gear 7 and a reverse speed gear 8, each of the gears 6, 7 and 8 being supported on the input shaft for rotation relative thereto. A hydraulically operated clutch, generally indicated by the reference character 9, is operatively interposed between the input shaft 1 and the low speed gear 6, the clutch 9 being operable by application of fluid pressure thereto to connect the gear 6 with the shaft 1 for rotation of the gear 6 in unison with the shaft 1, and to disconnect the gear 6 from the shaft 1 for rotation of the gear 6 relative to the shaft 1 upon release of said fluid pressure. Another hydraulically operated clutch, generally indicated by the reference character 11, is operatively interposed between the shaft 1 and the high speed gear 7, and between the shaft 1 and the reverse speed gear 8, the clutch 11 being operable by application of fluid pressure thereto to connect both gears 7 and 8 with the shaft 1 for rotation in unison with the latter, and to disconnect both gears 7 and 8 from the shaft 1 for rotation relative thereto upon release of said fluid pressure.

A quill shaft 12 which constitutes the output shaft of the change speed transmission, is journaled in bearings 13 and 14 below the input shaft 1, and carries a large diameter low speed gear 16, a small diameter high speed gear 17, and a large diameter reverse speed gear 18. The low speed gear 16 is splined to the quill shaft 12 and is axially fixed on the latter for constant mesh with the low speed gear 6. The high speed gear 17 and the reverse speed gear 18 are rotatably mounted on the quill shaft 12 in axially fixed positions by means of roller bearings 19 and 21 respectively, which permit each of these gears to rotate independently of the other relative to the shaft 12, the gear 17 being arranged in constant mesh with the high speed gear 7. The reverse speed gear 18 is connected with the reverse speed gear 8 through an idler gear 22 which, for clarity, is shown in Fig. 1 above the gear 8, but which is actually arranged in constant mesh with the gears 8 and 18. A clutch collar 23 is splined on the quill shaft 12 and may be shifted axially in one direction into clutching engagement with the high speed gear 17, and in the opposite direction into clutching engagement with the reverse gear 18.

The hydraulic clutches 9 and 11 are controlled by a plunger 24 which is axially slidable within the shaft 1 and which has an internal passage in communication with a suitable source of fluid pressure, not shown. In the position in which the control plunger 24 is shown in Fig. 1 no pressure fluid can pass to either of the clutches 9 and 11 and the gears 6 and 7 are therefore declutched from the shaft 1 and the transmission is in neutral. In other words, Fig. 1 shows the control plunger 24 adjusted to a neutral position. In order to clutch the low speed gear 6 to the shaft 1 and thereby establish the low speed drive, the control plunger is moved from its neutral position towards the right in Fig. 1, to a position in which pressure fluid is admitted through the plunger to the clutch 9. Normally, the clutch collar 23 is engaged with the high speed gear 17, and during low speed drive the high speed gear 7 will therefore be rotated at a slower speed than the input shaft 1, the clutch 11 being vented and therefore disengaged during low speed drive. In order to establish the high speed drive the control plunger 24 is adjusted from its neutral position towards the left in Fig. 1 to a position in which the clutch 9 is vented and pressure fluid is admitted through the plunger to the clutch 11. The power flow is then from the shaft 1 through the clutch 11, gears 7 and 17, and clutch collar 23 to the output shaft 12. During high speed drive the low speed gear 6 is declutched from the shaft 1 due to the venting of the clutch 9, and the low speed gear 6 will be driven at a higher speed than the input shaft 1.

In order to establish the reverse speed drive, the clutch collar 23 is moved into clutching engagement with the reverse speed gear 18 while the control plunger 24 is in its neutral position, and thereafter the control plunger is moved to its high speed position so as to engage the clutch 11.

The quill shaft 12 has an enlarged head 26 to which a drum 27 is secured coaxially with the quill shaft, as by a circumferential series of bolts 28 one of which is shown in Fig. 2. Another head 29 is similarly secured to the end of the drum 27 remote from the head 26, as by a circumferential series of bolts 31 one of which is shown in Fig. 2. The head 29 has a central hub portion which is rotatably mounted in a ball bearing 32, a stationary support for the ball bearing 32 being indicated at 33. The support 33 may be part of a large casing structure which has a suitable wall portion 34 for mounting the bearing 3 of the input shaft 1 and the bearing 13 of the output shaft 12, and another wall portion 36 for mounting the bearing 4 of the input shaft and the bearing 14 of the output shaft. A stationary wall portion 37 to the left of the wall portion 36, for a purpose which will be described hereinbelow, also preferably forms part of said casing structure.

Referring to Fig. 2, a pair of relatively rotatable differential half-shafts W and X which are aligned on the axis of the quill shaft 12 (see Fig. 1), extend through the hubs 26 and 29, respectively, into the space within the drum 27. The two half-shafts W and X are differentially connected with each other within the drum 27 by a differential mechanism which comprises a pair of sun gears, generally designated by the reference characters 38 and 39, an annular planet carrier 41, and a set of four conical planet pinions 42 which are journaled, respectively, on four radial trunnions 43 of the planet carrier 41, as best shown in Fig. 3, and which mesh with the sun gears 38 and 39.

The sun gear 38 is made up in the form of a composite structure which comprises a mounting hub 44, a disk piece 46 and an annular bevel gear section 47. The mounting hub 44 is non-rotatably secured to the half-shaft W at the end of the latter adjacent to the half-shaft X, the half-shaft W having external splines 48 in engagement with internal splines of the hub 44. As best shown in the upper part of Fig. 2, a bolt 49 extends through the disk 46 and through an ear portion 45 of the hub 44, and a nut 51 is drawn up on the bolt 49 to rigidly secure the disk 46 to the hub 44. Referring to Fig. 4, it will be noted that three bolts 49 are equally spaced circumferentially of the hub 44, and the foregoing description with reference to the bolt 49 in Fig. 2, applies to all of the three bolts 49 shown in Fig. 4.

The disk piece 46 has a central hub which is rotatably supported on the head 26 by means of a roller bearing 52. At its periphery, the disk piece 46 has an axially extending rim portion 53, and an annular series of axially extending coupling teeth 54 are formed at the inside of the rim portion 53, as best shown in Fig. 3.

The bevel gear section 47 of the sun gear 38, which meshes with the conical planet pinions 42, has an annular skirt portion which is seated axially against an inner shoulder on the rim portion 53 of the disk piece 46. The bevel gear section 47 is circumferentially interlocked with the disk piece 46 by means of a circumferential series of external coupling teeth 56 which are formed on the skirt portion of the bevel gear section 47 and which extend axially into the spaces between the coupling teeth 54, as best shown in Fig. 3.

The sun gear 39 is an exact duplicate of the sun gear 38, and the same reference characters which have been applied in Fig. 2 to the various parts of the sun gear 38, have been applied in the same figure to the corresponding parts of the sun gear 39. The disk piece 46 of the sun gear 39 is rotatably supported on the head 29 of the drum 27 by means of a roller bearing 57, and the mounting hub 44 of the sun gear 39 is non-rotatably connected with the half-shaft X by means of external splines 58 of the latter matching internal splines of the surrounding mounting hub 44.

The radial trunnions 43 of the annular planet carrier 41 are interlocked with the drum 27 by means of annular cover plates 59, as best shown in Fig. 3. The axes of the trunnions 43 coincide with the axes of four relatively large radial holes 61 in the drum 27 midway between the opposite ends of the latter. The diameters of the holes 61 are slightly larger than the maximum diameters of the conical pinions 42 so that the latter can be slipped over the trunnions 43 after the one-piece annular planet carrier 41 has been moved into the drum. The plates 59 are then slipped over the trunnions 43 into the positions in which they are shown in Fig. 3, and in which positions they are secured to the drum 27 by cap screws 62, each plate being retained by four cap screws as shown in Fig. 1. To provide proper seats for the cover plates, flats are milled on the outside of the drum, as shown in Fig. 3, and each cover plate has a cylindrical hub which snugly fits into the respective hole 61.

From the foregoing description it will be seen that torque applied to the output shaft 12 of the change speed transmission will be transmitted through the head 26, drum 27 and cover plates 59 to the trunnions 43 of the planet carrier 41. From the planet carrier 41 the torque is transmitted to the half-shafts W and X through the conical planet pinions 42 and sun gears 38 and 39 in conformity with the well-known principles of an ordinary bevel gear differential, the pinions 42 and sun gears 38, 39 corresponding to the compensating gearing of such a differential.

In addition to the compensating gearing 38, 39 and 42, the drum 27 encloses an epicyclic gear system which forms part of the hereinbefore mentioned auxiliary gearing for impressing a differential drive upon the shafts W and X. As shown in the left hand lower half of Fig. 2, the mounting hub 44 of the sun gear 38 has an ear portion 63 in axially spaced relation to the radial web portion of the disk piece 46, and a pin 64 is non-rotatably mounted in aligned holes of the disk piece 46 and of the ear portion 63. The pin 64 has a threaded end portion on which a nut 66 is drawn up against the ear portion 63. Rotatably mounted on the pin 64 by means of a roller bearing 67 is a spur gear planet pinion 68.

Referring to Fig. 4, it will be noted that three pins 64 are equally spaced circumferentially of the hub 44, and that each of the pins 64 carries a spur gear planet pinion 68, the same as described hereinbefore with reference to Fig. 2. As indicated in Fig. 4, webs 69 are arranged in the spaces between the planet pinions 68, and these webs connect the ear portions 45 with the ear portions 63 of the mounting hub 44.

Each of the planet pinions 68 meshes with an auxiliary sun gear 71 which is mounted coaxially with the shaft W on a long sleeve 72, the sun gear 71 being splined on and thus non-rotatably secured to the sleeve 72 at the end of the latter adjacent to the mounting hub 44. Referring to Fig. 1, it will be seen that the sleeve 72 extends through the quill shaft 12 and has a flange at its outer end which is rigidly secured, as by bolts 73, to the mentioned stationary wall portion 37. The inside diameter of the sleeve 72 is somewhat larger than the outside diameter of the shaft W, and the outside diameter of the sleeve 72 is somewhat smaller than the inside diameter of the quill shaft 12, so that both the shaft W and the quill shaft 12 may freely rotate relative to the stationary sleeve 72. A bushing 74 is interposed between the sleeve 72 and the hub of the disk piece 46 in order to center the auxiliary sun gear 71 relative to the sun gear 38.

Another set of three auxiliary spur gear planet pinions 76 are mounted on the sun gear 39 of the main differential, the mounting of the planet pinions 76 corresponding to the mounting of the planet pinions 68 on the sun gear 38, and the foregoing description of the mounting of the planet pinions 68 similarly applies to the mounting of the planet pinions 76.

The three spur gear planet pinions 68 and the three spur gear planet pinions 76 are enveloped, respectively, by counter gear elements, that is by ring sections 77 and 78 of a sleeve gear which is generally indicated by the reference character 80. The sleeve gear 80 is arranged within the drum 27 concentrically with the shafts W and X and it is rotatable relative to the annular planet carrier 41 and also relative to the sun gears 38, 39 about the common axis of the shafts W and X. The two ring sections 77 and 78 of the sleeve gear 80 are rigidly connected together, inside of the annular planet carrier 41, by a circumferential series of bolts 79, and axial movement of the sleeve gear 80 relative to the planet carrier 41 is limited by wear rings 81 and 82 on the ring sections 77 and 78, respectively.

The ring section 77 of the sleeve gear 80 has a circumferential series of internal gear teeth 83, as best shown in Fig. 4, and the spur gear planet pinions 68 are in mesh with said circumferential series of internal gear teeth 83. The ring section 78 of the sleeve gear 80 has a similar circumferential series of internal gear teeth 84 (Fig. 2), the pitch diameter and the number of the gear teeth 84 being the same as the pitch diameter and the number of the gear teeth 83. The spur gear planet pinions 76 are in mesh with the circumferential series of internal teeth 84, the relative arrangement of the planet pinions 76 and ring sections 78 corresponding to the relative arrangement of the planet pinions 68 and ring section 77 which is shown in Fig. 4. The set of spur gear planet pinions 68 affords a three-point support for the ring section 77, and the set of spur gear planet pinions 76 affords a three-point support for the ring section 78. The supports afforded by the planet pinions 68 and 76 floatingly maintain the sleeve gear 80 as a whole in rotatable relation to the sun gears 38 and 39 and in rotatable relation to the annular planet carrier 41.

The three spur gear planet pinions 76 mesh with a second auxiliary sun gear 86 which is mounted coaxially with the shaft X on a sleeve 87 at the end of the latter adjacent to the hub 44 of the sun gear 39, the sleeve 87 having external splines matching internal splines of the sun gear 86 to secure the latter in non-rotatable relation to the sleeve 87. As shown in Fig. 2, the sleeve 87 extends axially through the hub sleeve which is formed on the disk piece 46 of the sun gear 39, and through the hub of the head 29, a bushing 88 being interposed between the sleeve 87 and the surrounding hub sleeve of the disk 46 to rotatably support the sleeve 87 on said hub sleeve and to center the auxiliary sun gear 86 relative to the sun gear 39. The inside diameter of the sleeve 87 is somewhat larger than the outside diameter of the shaft X, and the outside diameter of the sleeve 87 is somewhat smaller than the inside diameter of the hub sleeve on the head 29, and the sleeve 87 is thus rotatively loose relative to the shaft X, sun gear 39, and drum 27.

Referring to Fig. 1, the outer end of the sleeve 87, is rotatably mounted on a stationary support 89 by means of a ball bearing 91, the support 89 preferably forming another wall portion of the mentioned casing structure which includes the wall portions 33, 34, 36 and 37. Mounted on the portion of the sleeve 87 which extends between the ball bearings 32 and 91 is a gear wheel 92 which has two peripheral gear sections 93 and 94, the hub of the gear wheel 92 being splined on the sleeve 87 so as to lock the gear wheel 92 and sleeve 87 together for rotation as a unit about the axis of the shaft X.

The portion of the sleeve 87 which extends between the gear wheel 92 and the bearing 91 is surrounded by a stationary brake drum 96 which is secured to the support 89, as by cap screws 97. A suitable brake mechanism including a stack of brake disks 98 is arranged inside of the drum 96 and connected with the sleeve 87 for the purpose of releasably securing the sleeve 87 against rotation. The brake mechanism may be of any conventional type, and for purposes of explanation it may be assumed that the drum 96 encloses, in addition to the stack of disks 98, a hydraulically operable mechanism which functions in response to admission of fluid pressure thereto to axially compress the stack of disks 98 so that braking force will be applied to the sleeve 87, and which mechanism functions in response to release of said fluid pressure, to relieve the stack of disks of axial compression so that the sleeve 87 will be released for rotation relative to the drum 96.

An auxiliary drive shaft 99 is rotatably mounted in axial alignment with the input shaft 1 of the change speed transmission, as shown in Fig. 1, antifriction bearings for rotatably supporting the shaft 99 being mounted in supports 101, 102 and 103 which, like the supports 33, 34, 36, 37 and 89 may be wall portions of the mentioned casing structure. In the space between the supports 102 and 103 a driving gear 104 in constant mesh with the gear section 93 of the gear 92 is mounted on the shaft 99 in rotatively loose relation thereto, and a hydraulic clutch, generally indicated by the reference character 106, is operatively interposed between the shaft 99 and the gear 104, the clutch 106 being operable upon admission of fluid pressure thereto, to clutch the gear 104 to the shaft 99 and to declutch it therefrom upon release of said fluid pressure.

Also rotatably mounted on the shaft 99 between the supports 102 and 103 is a reverse driving gear 107, and another hydraulic clutch, generally indicated by the reference character 108, is operatively interposed between the shaft 99 and the reverse gear 107, the clutch 108 being operable upon admission of fluid pressure thereto, to clutch the gear 107 to the shaft 99 and to declutch it therefrom upon release of said fluid pressure. The reverse driving gear is drivingly connected with the gear section 94 of the gear wheel 92 by an idler gear 109 which is shown in Fig. 1, for clarity, above the gear 107 but which is actually mounted in such a position so as to be in constant mesh with the gear 107 and with the gear section 94 of the gear wheel 92.

The hydraulic clutches 106 and 108 are controlled in a suitable manner, as by means of a control plunger 111 which, like the control plunger 24 of the change speed transmission, may be adjusted to a neutral position and to two drive establishing positions, the arrangement being such that upon adjustment of the control plunger 111 to its neutral position both gears 104 and 107 are declutched from the auxiliary drive shaft 99, and that a forward driving connection between the shaft 99 and the sleeve 87 will be established upon adjustment of the control plunger 111 to one of its drive establishing positions, and that a reverse driving connection between the shaft 99 and the sleeve 87 will be established upon adjustment of the control plunger 111 to the other of its drive establishing positions.

The control mechanism for the clutches 106 and 108 is preferably interrelated with the control mechanism for the brake mechanism within the brake drum 96 in such a manner that when the control plunger 111 is in its neutral position the brake mechanism is effective to apply a braking force to the sleeve 87, and that such braking force is automatically released whenever the control plunger 111 is moved from its neutral position to either of its drive-establishing postions, that is, the sleeve 87 will be released for rotation preparatory to establishment of the forward driving connection through the clutch 106, and also preparatory to establishment of the reverse driving connection through the clutch 108.

Integrally formed with the auxiliary drive shaft 99 at the end of the latter next to the input shaft 1 of the change speed transmission, is a bevel gear 112 for application of driving power to the shaft 99, as will be described hereinbelow.

Referring to Fig. 5, the bevel gear 2 of the input shaft 1 of the change speed transmission meshes with a bevel gear 113 which is rigidly connected with a tubular shaft 114. The shaft 114 forms the tail shaft of a hydraulic torque converter, which is generally indicated by the reference character 116, and which comprises a housing 117, an input shaft 118, a pump rotor 119 secured to the input shaft 118, two sets of reaction blades 121 secured to the housing 117, and a turbine wheel 122 secured to the tubular tail shaft 114. As to its general construction and mode of operation, the torque converter 116 conforms with well-known principles, and a further description in this connection is believed unnecessary. It should be noted, however, that the input shaft 118 has an axial extension 123 which is directly coupled to the input shaft 118 for rotation in unison therewith, the extension 123 being freely rotatable within the tubular tail shaft 114 and projecting rearwardly beyond the bevel gear 113 and past the bevel gear 112 of the auxiliary drive shaft 99. A companion bevel gear 124 for the bevel gear 112 is splined on the rear end of the extension shaft 123 for transmitting driving power from the latter to the auxiliary drive shaft 99. The bevel gear 124 has an axially extended hub sleeve which is rotatably mounted in a bearing 126, and a power take-off shaft 127 for general utility purposes has a splined connection with the hub sleeve of the bevel gear 124.

All of the mechanism shown in Figs. 1 to 5 inclusive is intended, as has been mentioned hereinbefore, for installation in a motor vehicle, not shown, and provisions will have to be made for connecting the vehicle motor in driving relation with the input shaft 118 of the hydraulic torque converter 116, and for connecting traction devices at opposite sides of the vehicle in driven relation with the half-shafts W and X, respectively. Such provisions may be made in conventional manner and are therefore believed to require no further explanation. It should be noted, however, that due to the incorporation of the hydraulic clutches 9 and 11 in the change speed transmission, which have been described hereinbefore in connection with Fig. 1, the driving shaft of the vehicle engine may be coupled directly to the input shaft 118 of the torque converter, that is, without the interposition of the usual master clutch between the vehicle engine and the input shaft of the torque converter.

The mode of operation of the change speed transmission, and the transmission of torque from the transmission output shaft 12 to the half-shafts W and X through the compensating gearing comprising the conical planet pinions 42 and the sun gears 38 and 39 has already been explained hereinbefore. The arrow 128 in Fig. 2 indicates the direction in which the output shaft 12 may be rotated for forward propulsion of the vehicle upon establishment of the low speed drive through the clutch 9, and upon establishment of the high speed drive through the clutch 11, it being understood that traction devices at opposite sides of the vehicle are connected with the shafts W and X through final drive gearing, not shown, which reverses the rotation of the traction devices relative to the respective shafts W and X.

Let it now be assumed that the gears 104 and 107 of the auxiliary gearing are declutched from the auxiliary drive shaft 99 by the clutches 106 and 108, and that the converter input shaft 118 and the converter tail shaft 114 are running in order to rotate the output shaft 12 of the change speed transmission in the direction of arrow 128 in Fig. 2. Rotation of the extension shaft 123 incidental rotation of the input shaft 118 will be transmitted through the bevel gears 124 and 112 to the auxiliary drive shaft 99, but since both gears 104 and 107 are declutched from said shaft, no rotation will be transmitted to the gear wheel 92 and the sleeve 87 which carries the auxiliary sun gear 86. In actual practice, the sleeve 87 is preferably locked against rotation by the brake mechanism 96, 98 as long as both gears 104 and 107 are declutched from the shaft 99.

Under the assumed conditions rotation of the transmission output shaft 12 in the direction of arrow 128 in Fig. 2, will be effective to also rotate the shafts W and X in the direction of arrow 128, the main sun gears 38 and 39 rotating in unison with the planet carrier 41, that is, without rotation relative to each other. Such unitary rotation of the sun gears 38 and 39 imparts an orbital movement to the spur gear planet pinions 68 and 76, which are in mesh, respectively, with the auxiliary sun gears 71 and 86. In the embodiment of the invention as shown in Fig. 1, the auxiliary sun gear 71 is permanently fixed against rotation, and since the auxiliary sun gear 86 is also fixed against rotation by application of a braking force to the sleeve 87, as assumed at present, it follows that the spur gear planet pinions 68 and 76 will rotate about the axes of their respective supporting pins 64. while the sun gears 38 and 39 are rotated in the direction of arrow 128.

The pitch diameter and the number of teeth of the auxiliary sun gear 71 are the same as the pitch diameter and number of teeth of the auxiliary sun gear 86, and the pitch diameters and numbers of teeth of the spur gear planet pinions 68 are the same as the pitch diameters and numbers of teeth of the spur gear planet pinions 76. The sleeve gear 80 which meshes with both sets of planet pinions 68 and 76 has internal teeth 83 and 84 at its opposite ends which are fully identical with respect to number and pitch diameter, as has been stated hereinbefore. Under these conditions, rotation of the sun gears 38 and 39 in the direction of arrow 128 will also cause rotation of the sleeve gear 80 in the direction of said arrow, but at a higher speed than that at which the sun gears 38, 39, the planet carrier 41 and the shafts W and X rotate, while the auxiliary sun gear 86 is locked against rotation.

The assembly comprising the planet carrier 41, the bevel pinions 42, the sun gears 38 and 39 and the shafts W and X is rotatable as a unit, practically without restraint by the auxiliary gearing within the drum 27, when both auxiliary sun gears 71 and 86 are locked against rotation. It will be noted, however, that relative rotation of the shafts W and X about their common axis is made impossible by the locking of the auxiliary sun gear 86. If the shaft X, for instance, should tend to overrun the shaft W, the set of spur gear planet pinions 76 would tend to increase the speed of the sleeve gear 80, but the speed of the sleeve gear 80 can obviously not be increased without at the same time increasing the speed of the shaft W through the set of spur gear planet pinions 68. The inability of the shafts W and X to rotate relative to each other while the sun gear 86 is locked against rotation, precludes differential action of the main differential 38, 39, 42 or in other words, the main differential is locked by locking of the sun gear 86.

Considering now the application of driving torque to the auxiliary sun gear 86 through the gear mechanism which is interposed between the sleeve 87 and the auxiliary drive shaft 99, as shown in Fig. 1, the following is to be noted.

Engagement of the hydraulic clutch 106 couples the gear 104 to the auxiliary drive shaft 99, as has been explained hereinbefore, and for purposes of explanation it may first be assumed that such engagement of the clutch 106 is effected while the input shaft 118 and the shaft extension 123 of the torque converter 116 are running but the change speed transmission is in neutral, and consequently no driving torque is transmitted to the output shaft 12 and to the drum 27. Rotation of the shaft extension 123 is transmitted to the auxiliary drive shaft 99 through the bevel gears 124 and 112, and before the clutch 106 is engaged the brake mechanism 96, 98 is released, as explained hereinbefore. Upon engagement of the clutch 106, the sleeve 87 and the sun gear 86 will then be rotated in the direction of arrow 129 in Fig. 2. The rotary torque acting on the auxiliary sun gear 86 tends to rotate the spur gear planet pinions 76 about their supporting pins 64, but these pinions mesh with the sleeve gear 80, and the torque of the sun gear 86 is therefore transmitted through the pinions 76 in reverse direction to the sleeve gear 80 and tends to turn said sleeve gear in the direction of arrow 131 in Fig. 2. The sleeve gear 80, in turn, meshes with the spur gear planet pinions 68, and the tendency of the sleeve gear 80 to rotate in the direction of arrow 131 causes a tendency of the spur gear planet pinions 68 to rotate about the axes of their supporting pins 64. However, since the planet pinions 68 are in mesh with the auxiliary sun gear 71 which, as stated, is locked against rotation, the planet pinions 68 cannot rotate freely on their supporting pins 64. The rotary reaction of the locked sun gear 71 upon the planet pinions 68 causes an orbital reaction, in the direction of arrow 131, upon the mounting pins 64 of the planet pinions 68, which are secured to the sun gear 38, and the rotary reaction of the locked sun gear 71 upon the planet pinions 68 further causes an orbital reaction, in the direction of arrow 128, upon the mounting pins 64 of the planet pinions 76 which are secured to the sun gear 39, and as a further result the bevel pinions 42 which are in mesh with the sun gears 38 and 39 become subjected to a rotary torque which tends to turn the pinions 42 about the axes of their respective mounting trunions 43. From these considerations it will be apparent that the sun gear 38 and the shaft W which is non-rotatably connected with said sun gear will be rotated in the direction of arrow 131, and that the sun gear 39 and the shaft X which is non-rotatably connected therewith will be rotated in the direction of arrow 129 when the sleeve 87 and the sun gear 86 are rotated in the direction of arrow 129. In other words, application of driving power to the auxiliary gearing by engagement of the clutch 106 impresses a differential drive upon the shafts W and X, and under the assumed condition that no torque is applied to the drum 27 by the output shaft 12 of the change speed transmission, the speeds at which the shafts W and X are driven will be the same, the shaft W turning in the direction of arrow 131 at the same speed as that at which the shaft X turns in the direction of arrow 129.

Designating the rotary speed of the sleeve 87 and sun gear 86, that is their number of revolutions per minute, as N, and further designating the rotary speed of the shaft X, that is its number of revolutions per minute, as $n$, it can be shown that the gear ratio between the sleeve 87 and the shaft X is $$\frac{N}{n} = +\frac{2d}{s}\left(1+\frac{s}{d}\right)$$
$$= +2\left(\frac{d}{s}+1\right)$$

wherein $d$ represents the identical tooth numbers at opposite ends of the sleeve gear 80, that is the number of teeth 83 which is identical with the number of teeth 84, and wherein $s$ represents the identical tooth numbers of the auxiliary sun gears 71 and 86, that is, the number of gear teeth on one of these gears which is identical with the number of gear teeth on the other. The first plus sign in the above expression indicates that the direction of rotation of the shaft X is the same as that of the sleeve 87 and sun gear 86.

The arrow 129 in Fig. 2 indicates the direction in which the sleeve 87 and the sun gear 86 are rotated upon engagement of the clutch 106, as explained hereinbefore. From Fig. 1 it will be apparent that engagement of the clutch 108 will cause transmission of driving power from the shaft 99 to the sleeve 87 and sun gear 86 in such a manner that the direction in which the sleeve 87 and the sun gear 86 rotate will be opposite to that indicated by the arrow 129. Such opposite rotation of the sleeve and sun gear will again impress a differential drive upon the shafts W and X, as will be readily understood in view of the foregoing explanations, but the directions in which the shafts rotate will be opposite to those in which they are rotated upon engagement of the clutch 106; that is, the shaft W will be rotated in the direction of arrow 129 and the shaft X will be rotated in the direction of arrow 131.

The hydraulic clutches 9 and 11 of the change speed transmission are operable independently of the hydraulic clutches 106 and 108 of the auxiliary gearing, and also independently of the brake mechanism 96, 98. Let it now be assumed that the low speed drive is established by engagement of the clutch 9 and that while the output shaft 12 is rotating in the direction of arrow 128, the clutch 106 is engaged after release of the brake mechanism 93, 98. In that case a differential drive will be super-imposed upon the drive which is transmitted to the shafts W and X through the main differential 38, 39 and 42. The mechanism as a whole now functions to rotate the shaft W in the direction of arrow 128 but at a lower speed than the transmission output shaft 12, and to also rotate the shaft X in the direction of arrow 128 but at higher speed than the transmission output shaft 12, the speed decrease of the shaft W from the speed of the output shaft 12 being equal to the speed increase of the shaft X over the speed of the output shaft 12.

If, instead of the clutch 106, the clutch 108 is engaged while the low speed drive is established and the output shaft 12 is rotating in the direction of arrow 128, the shafts W and X will again be driven at different speeds in the direction of arrow 128, but in this case the shaft X will rotate at a lower speed, and the shaft W will rotate at a proportionally higher speed, than the output shaft 12.

The foregoing explanations as to the functioning of the auxiliary gearing to superimpose a differential drive upon the main drive, that is, upon the drive which is transmitted from the output shaft 12 to the shafts W and X through the differential 38, 39 and 42, while the change speed transmission is in low gear, similarly apply for operation of the change speed transmission in high gear and reverse gear. It should be noted, however, that the speed which is subtracted from the speed of the shaft W and which is added to the speed of the shaft X upon engagement of the clutch 106 is the same irrespective of whether the output shaft 12 of the transmission is driven at a relatively low speed through the low speed gear train 6, 16 or through the high speed gear train 7, 17. This is so because the drive for the auxiliary gearing is derived directly from the input shaft of the torque converter rather than from the output shaft of the change speed transmission.

The foregoing considerations with respect to differential rotation of the shafts W and X similarly apply when the transmission of auxiliary driving power to the sleeve 87 is effected through the clutch 108, rather than, as assumed hereinbefore, through the clutch 106.

The torque converter 116 operates to transmit power from the input shaft 118 to the tail shaft 114 in such a manner that the speed of the tail shaft will automatically adjust itself to prevailing load conditions, that is, under certain conditions the speed of the tail shaft 114 may fall considerably below the speed of the input shaft 118. Upon such deceleration of the tail shaft 114 the speed at which the shafts W and X are driven through the change speed transmission will be correspondingly decelerated, irrespective of whether the change speed transmission operates in low, high gear or reverse. The effectiveness of the auxiliary gearing to impress or superimpose a differential drive upon the shafts W and X is not affected, however, by variation of the torque and driving speed of the converter tail shaft 114 because the driving power for the auxiliary drive shaft 99 is derived directly from the input shaft 118 through the extension shaft 123 and the bevel gears 112 and 124, as has been explained hereinbefore.

The advantages to be derived from the mechanism shown in Figs. 1 to 5, are particularly desirable in an automotive vehicle. In this connection reference may be had to the afore-mentioned earlier application and to the discussion therein of certain basic considerations regarding the construction and operation of motor vehicles which are steered by driving. Said considerations include the provision of a speed reducing planetary gearing which relieves the steering power transmitting mechanism from undesirably high torque loads and thereby makes it possible to construct said mechanism substantially lighter than the propelling power transmitting mechanism; further, the provision of predetermined radii of turning of the vehicle; the elimination of friction losses during turning; positive control of the traction devices at all times; and several ancillary matters. The mechanism disclosed herein incorporates the basic operating characteristics by means of which all of these matters may be taken care of in a practical and entirely satisfactory manner.

For motor vehicle use it may be required or desirable to incorporate a service brake in the mechanism shown in Fig. 1, and the drum 27 may readily be utilized for that purpose. A brake band, generally indicated by the reference character 132 in Fig. 1, is arranged around the drum 27, and a suitable mechanism, not shown, may be provided for tightening the brake band upon and releasing it from the drum, friction linings for engagement with the cylindrical outer surface portions of the drum at opposite sides of the cover plates 59 being indicated at 133.

The principal operating characteristics of the mechanism shown in Figs. 1 to 5 may be incorporated in a variety of modified constructions some of which are shown schematically in Figs. 6 to 9, inclusive.

In Fig. 6, shafts W and X are connected with each other by a differential mechanism which, like the differential mechanism shown in Fig. 2, comprises annular planet carrier 41, bevel pinions 42 and sun gears 38 and 39. In conformity with the mechanism shown in Fig. 2, the mechanism shown in Fig. 6 further comprises auxiliary sun gears 71 and 86 mounted on sleeves 72 and 87, respectively; two sets of spur gear planet pinions 68 and 76 mounted, respectively, on the sun gears 38 and 39, and a sleeve gear 80. As distinguished from the planet pinions 68 in Fig. 2, the planet pinions 68 in Fig. 6 each have a gear section 134 at the outer side of the sun gear 38, and a gear section 136 at the inner side of the sun gear 38. Similarly, the planet pinions 76 in Fig. 6 have outer and inner gear sections 134 and 136 corresponding to the gear sections 134 and 136 of the planet pinions 68, and the outer gear sections 134 of the planet pinions 68 and 76 mesh with the sun gears 71 and 86, respectively. As shown in Fig. 6, the sleeve gear 80 has external gear teeth 83 and 84 in mesh, respectively, with the inner gear sections 136 of the planet pinions 68 and 76, and in this respect the sleeve gear 80 in Fig. 6 is distinguished from the sleeve gear 80 in Fig. 2 where the gear teeth 83 and 84 are formed internally of the sleeve gear 80. The gearing shown in Fig. 6 is enclosed in a rotatable drum structure 27 in substantial conformity with the showing in Fig. 2, a bevel ring 144 on the drum 27 being in mesh with a driving pinion 143. The explanations hereinabove with respect to the mode of operation of the mechanism shown in Fig. 2 analogously apply to the mechanism shown in Fig. 6.

In Fig. 7, shafts W and X are connected with each other by a differential mechanism comprising a spider structure 27, conical planet pinions 42, and sun gears 38 and 39. Auxiliary gearing for impressing a differential drive upon the shafts W and X comprises two auxiliary sun gears 71 and 86; two sets of planet pinions 68 and 76 which are mounted, respectively, on gear wheels 137 and 138; mating gears 139 and 141 for the gear wheels 137 and 138, respectively; and a sleeve gear 80. The auxiliary sun gears 71 and 86 in Fig. 7 are aligned and supported on a stationary shaft 142 which is mounted in parallel relation to and spaced transversely from the common axis of the shafts W and X, supporting sleeves 72 and 87 for the sun gears 71 and 86, respectively, corresponding to the supporting sleeves 72 and 87 in Fig. 2. The mounting gears 137 and 138 for the planet pinions 68 and 76 are mounted coaxially with and in rotatable relation to the shaft 142 and in rotatable relation to the sun gears 71 and 86. The mating gear 139 for the supporting gear 137 is mounted coaxially with and is non-rotatably secured to the shaft W, and the mating gear 141 for the gear 138 is mounted coaxially with and non-rotatably secured to the shaft X. A bevel pinion 143 for transmitting main driving power to the bevel gear differential 38, 39, 42 meshes with a bevel ring gear 144 secured to the spider structure 27. The mode of operation of the mechanism shown in Fig. 7 is similar to the mode of operation of the mechanism shown in Fig. 2, which will be readily apparent from the explanations hereinabove with reference to the mechanism shown in Figs. 1 to 5.

In Fig. 8 shafts W and X are differentially connected with each other in the same manner as shown in Fig. 7. Mounted coaxially with and non-rotatably secured to the shaft W is a bevel gear 146 which meshes with a bevel pinion 147 on a shaft 148, the latter being mounted for rotation on an axis extending at right angles to the common axis of the shafts W and X. The shaft 148 has a head on which spur gear planet pinions 68 are mounted for rotation about axes extending parallel to the axis of the shaft 148. The planet pinions 68 are enveloped by an internally toothed ring section 149 of a gear 151 which is mounted in axial alignment with the shaft 148 for rotation relative to the latter. An auxiliary sun gear 71 in mesh with the planet pinions 68 is mounted on a shaft 72 which, although it may be solid rather than tubular, corresponds to the shaft 72 in Fig. 2. The shaft X in Fig. 8 is connected with a gear system which is an exact duplicate of the gear system which is connected with the shaft W, and the various identical elements of the two-gear systems are designated by the same reference characters, except for the planet pinions, sun gear, and sun gear supporting shaft, which are designated by the reference characters 76, 86 and 87 in conformity with the reference characters in Fig. 2. Each of the gears 151 in Fig. 8 has a circumferential series of external teeth 152, and the two gears are intermeshed by means of these external teeth so that rotation of one gear 152 in one direction will cause rotation of the other gear 152 in the opposite direction. The mode of operation of the mechanism shown in Fig. 8 is similar to the mode of operation of the mechanism shown in Fig. 2, which will be apparent from the explanations hereinabove with reference to Figs. 1 to 5.

Fig. 9 illustrates an arrangement for applying driving power alternatively to the auxiliary sun gear 86 and to the auxiliary sun gear 71 of the mechanism shown in Fig. 2. The gearing within the drum 27, as shown in Fig. 9, is identical with the gearing shown in Fig. 2, as will be readily recognized from a comparison of the two figures. Non-rotatably secured to the supporting sleeve 87 of the auxiliary sun gear 86 in Fig. 9, is a gear 153, and a similar gear 154 is non-rotatably secured to the supporting sleeve 72 of the sun gear 71. The gears 153 and 154 mesh with gears 156 and 157, respectively, which are aligned on an auxiliary driving shaft 99, each gear 156 and 157 being mounted on the shaft 99 for rotation relative thereto and for rotation relative to the other. Operatively interposed between the shaft 99 and the gear 156 is a disk clutch 158, and a similar disk clutch 159 is operatively interposed between the shaft 99 and the gear 157. Integrally formed with the gear 156 is a brake drum which is enveloped by a brake band 161, and the gear 157 has a similar brake drum which is enveloped by a brake band 162.

The shaft 99 in Fig. 9 carries a bevel gear 112 for the application of driving power thereto through a companion bevel gear 124 in substantial conformity with the showing in Fig. 5.

A thrust collar 163 for engaging and releasing the clutch 158 is shiftable axially of the shaft 99 and is engaged by the upper end of a rock arm 164 which is fulcrumed intermediate its ends on a stationary bracket 166. Another thrust collar 167 and rock arm 168 corresponding to the thrust collar 163 and rock arm 164 provide for engagement and release of the clutch 159, the rock arm 168 being fulcrumed intermediate its ends on a stationary bracket 169. A control shaft 171 is mounted for rocking movement about its axis in parallel relation to the drive shaft 99 and carries two spirally grooved cylinders 172 and 173, the spiral grooves of the cylinders being pitched so as to lead in the same direction. The lower ends of the rock arms 164 and 168 engage the spiral grooves of the cylinders 172 and 173, respectively, so that the rock arms will be swung about their fulcrum centers at 166 and 169, respectively, by rocking movement of the control shaft 171 about its axis.

The control shaft 171 further carries two disks 174 and 176 each of which has an axially extending lug at its circumference, the disks being non-rotatably secured to the shaft 171, and the lugs being offset relative to each other circumferentially of the shaft. The purpose of the disks and lugs thereon is to tighten and loosen the brake bands 161 and 162 upon rocking of the control shaft, and two push rods 177 and 178 are provided for that purpose, the rod 177 extending slidably through a pair of clips connected, respectively, with the ends of the brake band 161, and the rod 178 extending slidably through a pair of clips connected, respectively, with the ends of the brake band 162. A coil spring 179 surrounding the push rod 177 bears at its lower end upon a collar which is secured to said rod, and at its upper end the coil spring bears against one of the clips of the brake band 161. The other clip of the brake band 161 is engaged by a head of the rod 177, and the coil spring 179 is properly preloaded so as to tighten the brake band 161 and thereby lock the gear 156 against rotation. At its lower end the push rod 177 has an arm for engagement with the lug of the disk 174.

Another coil spring 181 is placed around the push rod 178, and the foregoing explanations with respect to the rod 177 and spring 179 similarly apply to the rod 178 and coil spring 181, the coil spring 181 being effective to tighten the brake band 162 and thereby lock the gear 157 against rotation.

A lever 182 is secured to the control shaft 171, and may be swung either in the direction of arrow 170 or in the direction of arrow 180, in order to rock the shaft 171 about its axis when the lever 182 is swung in the direction of arrow 170 the lower end of the push rod 177 is engaged by the lug on the disk 174, and the arrangement is such that the movement transmitted to the rod 177 by rotation of the disk 174 in the direction of arrow 170 will push the rod 177 upwardly and thereby release the brake band 161. The other brake band 162 will not be released by movement of the disk 176 in the direction of arrow 170, the lug on the disk 176 being suitably arranged so that it will move away from the lower end of the rod 178 when the lever 182 is moved in the direction of arrow 170. On the other hand, when the lever 182 is swung in the direction of arrow 180, the brake 162 will be released by rotation of the disk 176, while the brake 161 remains engaged, the lug on the disk 174 moving away from the lower end of the rod 177.

In the position of the parts as shown in Fig. 9, both clutches 158 and 159 are disengaged so that the shaft 99 may rotate freely while both gears 156 and 157 are locked against rotation by the brakes 161 and 162. When the lever 182 is swung in the direction of arrow 170 and the brake 161 is thereby released, as explained hereinbefore, the clutch 158 will be engaged, but the clutch 159 will remain disengaged, the leads of the spiral grooves in the cylinders 172 and 173 being properly arranged so that both thrust collars 163 and 167 will be moved to the left in Fig. 9 when the lever 182 is moved in the direction of arrow 170. On the other hand, when the lever 182 is swung in the direction of arrow 180 and the brake 162 is thereby released while the brake 161 remains engaged, the clutch 159 will be engaged while the clutch 158 remains disengaged, both thrust collars 163 and 167 moving to the right in Fig. 9, when the lever 182 is moved in the direction of arrow 180.

The arrow 129 in Fig. 9 indicates the direction in which the sleeve 87 and the sun gear 86 will be rotated when the brake 161 is released and the clutch 158 is engaged by movement of the lever 182 in the direction of arrow 170. The sun gear 71 will be locked against rotation while the sun gear 86 rotates in the direction of arrow 129 in Fig. 9 because the sleeve 72 of the sun gear 71 is connected through the gear 154 with the gear 157 and the latter gear remains locked by the brake 162 when the lever 182 is moved in the direction of arrow 170. As a result of the rotation of the sun gear 86 in the direction of arrow 129 while the sun gear 71 is locked, a differential drive is impressed upon the shafts W and X, as has been explained hereinbefore in connection with the mechanism shown in Figs. 1 to 5.

The arrow 129 in Fig. 9 also indicates the direction in which the sleeve 72 and the sun gear 71 will be rotated when the brake 162 is released and the clutch 159 is engaged by movement of the lever 182 in the direction of arrow 180 in Fig. 9. Since the gear 156 remains locked by the brake 161 when the clutch 159 is engaged, the sun gear 86 will be locked against rotation while the sun gear 71 is rotated in the direction of arrow 129. As a result, a differential drive will again be impressed upon the shafts W and X, but the directions in which torque is applied to the shafts W and X by the auxiliary power derived from the shaft 99 in Fig. 9 will now be reversed as compared with the directions in which such torque is applied to the shafts W and X in the first case, that is, when the sun gear 86 is rotated in the direction of arrow 129 while the sun gear 71 is locked against rotation.

As pointed out hereinbefore, the gear ratio between the sleeve 87 and the shaft X is positive, which means that application of torque to the sleeve 87 in the direction of arrow 129, subjects the shaft X to torque in the same direction, and as a further consequence the shaft W becomes subjected to torque in the opposite direction of arrow 129. The gearing within the drum 27 is fully symmetrical, and it is therefore apparent that the gear ratio between the sleeve 72 and the shaft W is also positive. Consequently, the shaft W becomes subjected to torque in the same direction as that of arrow 129, and the shaft X becomes subjected to torque in the opposite direction of arrow 129 when driving torque is applied to the sun gear 71 in the direction of arrow 129.

The result obtained by engagement of the clutch 158 in Fig. 9 is the same as that which is obtained by engagement of the clutch 106 in Fig. 1, and the result obtained by engagement of the clutch 159 in Fig. 9 is the same as that which is obtained by engagement of the clutch 108 in Fig. 1.

The drum 27 in Fig. 9 carries a bevel ring gear 144 which meshes with a bevel pinion 143 for transmitting main driving power to the drum 27 and differential gearing 38, 39 and 42.

Considering the mechanism shown in Figs. 1 to 5, and the various modifications thereof shown in Figs. 6 to 9, from a general point of view, the following should be noted. In each case the mechanism comprises: first rotatably and orbitally movable pinion means which are represented in Figs. 2 and 6 to 9 by the conical planet pinions 42; rotatable gearing which in the illustrated embodiments of the invention comprises the sun gear 39, and which is operatively connected with the first pinion means 42 for epicyclic movement of the latter relative thereto; second rotatably and orbitally movable pinion means as represented by the planet pinions 76; pivotal supporting means, as represented by the pinion shafts 64, which are operatively connected, independently of the second pinion means 76, with the mentioned gearing (39) for rotation thereby about the axis of orbital movement of the second pinion means 76; a pair of relatively rotatable driven elements W and X which are differentially connected with each other by said first pinion means 42; driving means, which in Fig. 1 include the output shaft 12 and in Figs. 6 to 9 include the bevel gear 144, and which are operable to apply an orbital torque component to the first pinion means 42; other driving means which include the sun gear 86 and which are operable to apply a first torque component to said second pinion means 76, said first torque component, in the illustrated embodiments of the invention, being a rotary torque component; and torque transmitting means operative to apply a second torque component to the second pinion means 76 in response to application of said first torque component to the latter, said second torque component, in the illustrated embodiments of the invention, being an orbital torque component.

In the illustrated embodiments of the invention, the mentioned torque transmitting means include the sun gear 71, the planet pinions 68 and the sleeve gear 80, all of which elements are effective, as explained in connection with Fig. 2, to subject the planet pinions 76, that is second pinion means, to an orbital torque component, in response to application of said first (rotary) torque component to the second pinion means 76, so that said second pinion means will be driven rotatively and orbitally, and said driven elements W and X will be rotated differentially relative to each other, upon application of said first (rotary) torque component to said second pinion means 76. The sleeve gear 80 in Figs. 2, 6, and 7, and either one of the gears 151 in Fig. 8, constitute a rotary torque transmitting element of the mentioned torque transmitting means, which is operatively connected with the second pinion means 76.

As explained hereinbefore, in connection with Fig. 2, the planet pinions 76, as well as the planet pinions 68, become subjected to orbital torque when the sun gear 86 is rotated while the sun gear 71 is locked against rotation, and this function occurs likewise in all of the modified mechanisms. That is, each illustrated embodiment of the invention includes second pinion means 76 and third pinion means 68; driving means operable to apply a first torque component to the second pinions, as pointed out hereinbefore; a rotary torque transmitting element, such as the sleeve gear 80 or one of the gears 151 in Fig. 8, operatively connected with the second and third pinion means 76 and 68, and operative, upon application of said first torque component to said second pinion means 76, to apply a first torque component to said third pinion means 68; and torque transmitting means, which in the illustrated embodiments include the mentioned torque transmitting element (80 or 151) and the sun gear 71, and which are operative to apply second torque components to said second and third pinion means in response to application of said first torque component to said second pinion means 76.

It will further be noted that in each of the illustrated embodiments the over-all ratio of the gear train comprising the sun gear 86, planet pinions 76 and the gear section (84 in Fig. 2 and 151 in Fig. 6) in mesh with said planet pinions, is equal to the over-all ratio of the gear train comprising the sun gear 71, the planet pinions 68 and the gear section (83 in Fig. 2 and 149 in Fig. 6) in mesh with the planet pinions 68.

Referring to Fig. 2, the drum 27 encloses a first and a second epicyclic gearing each comprising three relatively rotatable elements, one element of the first epicyclic gearing being the right disk 46 which in effect forms the spider of said first gearing, another element of the first epicyclic gearing being represented by the counter gear 78, and the last element of the first epicyclic gearing being represented by the auxiliary sun gear 86. Similarly, one element of the second epicyclic gearing is the left disk 46 which in effect forms the spider of the second epicyclic gearing, another element of the second gearing is represented by the counter gear 77, and the last element of the second epicyclic gearing is represented by the sun gear 71. With these definitions, the mechanism shown in Fig. 2 may be considered as comprising means connecting a first of said elements of the first epicyclic gearing, for instance the right spider 46, independently of the second (78) and third (86) elements of said first gearing and independently of said second gearing (46, 77, 71) and of the main planet pinions 42, in power transmitting relation with one of the shafts W, X; means connecting a first of the elements of said second gearing, for instance the left spider 46, independently of the second (77) and third (71) elements of said second gearing and independently of said first gearing (46, 78, 86) and of the main planet pinions 42, in power transmitting relation with the other of the shafts W, X; and rotatable torque transmitting means, as represented for instance by the bolts 79, in rotatively loose relation to the main planet carrier 41 and operatively connecting said second element (78) of said first gearing with said second element (77) of said second gearing, independently of said first (46, 46) and third (86, 71) elements of each of said epicyclic gearings. Main driving means, such as the change speed transmission at the left in Fig. 1, are connected in driving relation with the main planet carrier 41; auxiliary driving means, such as the reversible gearing at the right of Fig. 1, are connected in driving relation with the third element (86) of one of the epicyclic gearings; and means, as represented in Fig. 1, for instance, by the bolts 73, are provided to restrain rotation of the third element (71) of the other of the epicyclic gearings.

From the description hereinbefore of the mechanism shown in Fig. 2 it will further be apparent that the gear ratio between the first (46) and the second (78) elements of the first epicyclic gearing, at zero speed of its third element (86), is equal to the gear ratio between said first (46) and second (77) elements of the second epicyclic gearing at zero speed of the third element (71) of said second gearing; and that the gear ratio between said first (46) and third (86) elements of said first gearing at zero speed of its second element (78), is substantially equal to the gear ratio between said first (46) and third (71) elements of said second gearing at zero speed of the second element (77) of said second gearing.

In the embodiment of the invention as shown in Fig. 9, the shaft 99 represents an auxiliary rotatable drive element; clutches 158 and 159 represent first control means which are operable to selectively connect one or the other of the auxiliary sun gears 86 and 71 in driven relation with the auxiliary drive element 99; and the brakes 161 and 162 represent second control means which are operable to selectively restrain rotation of one or the other of the auxiliary sun gears 71, 86.

More specifically, the first control means, that is the clutches 158 and 159, are selectively operable by means of the cam cylinders 172, 173 and rockers 164, 168 to establish a driving connection between the auxiliary drive element 99 and the first auxiliary sun gear 86, or between the auxiliary drive element 99 and the second auxiliary sun gear 71, or to establish a non-driving relation between said auxiliary drive element and both of said auxiliary sun gears; and the second control means, namely the brakes 161 and 162, are selectively operable by means of the disks 174, 176 and push rods 177, 178 to restrain rotation of the first auxiliary sun gear 86 while the first control means 158, 159 are operative to connect the second auxiliary sun gear 71 in driven relation with the auxiliary drive element 99, or to restrain rotation of the second auxiliary sun gear 71 while the first control means 158, 159 are operative to connect the first auxiliary sun gear 86 in driven relation with the auxiliary drive element 99. In the embodiment of the invention as shown in Fig. 9, the first and second control means are so interrelated that the second control means will restrain rotation of both auxiliary sun gears while the first control means are operative to establish said non-driving relation between the auxiliary drive element 99 and the auxiliary sun gears 86 and 71.

It should be understood that it is not intended to limit the invention to the particular forms and details described hereinabove and that the invention includes such other forms and modifications as are embraced by the scope of the appended claims.

It is claimed and desired to secure by Letters Patent:

1. A power transmitting mechanism comprising, first rotatably and orbitally movable pinion means, rotatable gearing operatively connected with said first pinion means for epicyclic movement of the latter relative thereto, second rotatably and orbitally movable pinion means, pivotal supporting means for said second pinion means operatively connected independently of the latter with said gearing for rotation thereby about the axis of orbital movement of said second pinion means; a pair of relatively rotatable driven elements differentially connected with each other by said first pinion means, driving means operable to apply an orbital torque component to said first pinion means, other driving means operable to apply a first torque component to said second pinion means, and torque transmitting means operative to apply a second torque component to said second pinion means in response to application of said first torque component to the latter, so that said second pinion means will be driven rotatively and orbitally, and said driven elements will be rotated differentially relative to each other, upon application of said first torque component to said second pinion means.

2. A power transmitting mechanism as set forth in claim 1, in which said torque transmitting means include a rotary torque transmitting element operatively connected with said second pinion means.

3. A power transmitting mechanism as set forth in claim 1, in which said torque transmitting means include a rotary torque transmitting element mounted for rotation relative to said second pinion means about the axis of orbital rotation of the latter, and in which said rotary torque transmitting element has an annular gear section in mesh with said second pinion means.

4. A power transmitting mechanism as set forth in claim 1, in which said torque transmitting means include a rotary sleeve element mounted for rotation relative to said second pinion means about the axis of orbital rotation of the latter, and in which said sleeve element has an internal annular gear section in mesh with said second pinion means.

5. A power transmitting mechanism comprising, first pinion means mounted for rotary movement and for orbital movement conjointly with said rotary movement, rotatable gearing operatively connected with said first pinion means for epicyclic movement of the latter relative thereto, second rotatably and orbitally movable pinion means, pivotal supporting means for said second pinion means extending axially in parallel radially spaced relation to the axis of orbital movement of said first pinion means and operatively connected, independently of said second pinion means, with said gearing for rotation thereby about said axis, a pair of relatively rotatable driven elements aligned on said axis and differentially connected with each other by said first pinion means, driving means operable to apply an orbital torque component to said first pinion means, other driving means operable to apply a first torque component to said second pinion means, a sleeve gear concentric with said axis and in mesh with said second pinion means, and torque transmitting means including said sleeve gear, operative to apply a second torque component to said second pinion means in response to application of said first torque component to the latter, so that said second pinion means will be driven rotatively and orbitally, and said driven elements will be rotated differentially relative to each other, upon application of said first torque component to said second pinion means.

6. A power transmitting mechanism comprising first rotatably and orbitally movable pinion means, two relatively rotatable gear elements operatively connected with said first pinion means for epicyclic movement of the latter relative thereto, second and third rotatably and orbitally movable pinion means, pivotal supporting means for said second pinion means operatively connected, independently of said second pinion means, with one of said gear elements for rotation thereby about the axis of orbital movement of said second pinion means, pivotal supporting means for said third pinion means operatively connected, independently of said third pinion means, with the other of said gear elements for rotation thereby about the axis of orbital movement of said third pinion means, a pair of relatively rotatable driven elements differentially connected with each other by said first pinion means, driving means operable to apply an orbital torque component to said first pinion means, other driving means operable to apply a first torque component to said second pinion means, a rotary torque transmitting element operatively connected with said second and third pinion means and operative, upon application of said first torque component to said second pinion means, to apply a first torque component to said third pinion means, and torque transmitting means, including said rotary torque transmitting element, operative to apply second torque components to said second and third pinion means in response to application of said first torque component to said second pinion means, so that said second and third pinion means will be driven rotatively and orbitally, and said driven elements will be rotated differentially relative to each other upon application of said first torque component to said second pinion means.

7. A power transmitting mechanism comprising first rotatably and orbitally movable pinion means, a pair of relatively rotatable driven elements differentially connected with each other by said first pinion means, second and third rotatably and orbitally movable pinion means, relatively rotatable supports connected in torque transmitting relation with said driven elements, respectively, one of said supports operatively mounting said second pinion means, and the other of said supports operatively mounting said third pinion means, driving means operable to apply an orbital torque component to said first pinion means, a pair of sun gears in mesh, respectively, with said second and third pinion means, means mounting one of said sun gears in rotatable relation to the other, means for restraining said other sun gear against rotation, a rotatable torque transmitting element operatively connected with both of said second and third pinion means, and auxiliary drive means operatively connected with said one sun gear.

8. A power transmitting mechanism comprising, first rotatably and orbitally movable pinion means, a pair of relatively rotatable driven elements differentially connected with each other by said first pinion means, second pinion means mounted on one of said driven elements for rotation relative thereto and for orbital movement thereby about the axis of orbital movement of said first pinion means, driving means operable to apply an orbital torque component to said first pinion means, other driving means operable to apply a rotary torque component to said second pinion means, and torque transmitting means operative to apply an orbital torque component to said second pinion means in response to application of said rotary torque component to the latter, so that said second pinion means will be driven rotatively and orbitally, and said driven elements will be rotated differentially relative to each other upon application of said rotary torque component to said second pinion means.

9. A power transmitting mechanism comprising, first pinion means mounted for rotary movement and for orbital movement about a main axis at right angles to the axis of said rotary movement, a pair of relatively rotatable driven elements aligned on said main axis and differentially connected with each other by said first pinion means, second pinion means rotatably mounted on one of said driven elements in radially spaced parallel relation to said main axis, driving means operable to apply an orbital torque component to said first pinion means, other driving means operable to apply a rotary torque component to said second pinion means, a sleeve gear concentric with said main axis and in mesh with said second pinion means, and torque transmitting means including said sleeve gear, operative to apply an orbital torque component to said second pinion means in response to application of said rotary torque component to the latter, so that said second pinion means will be driven rotatively and orbitally, and said driven elements will be rotated differentially relative to each other upon application of said rotary torque component to said second pinion means.

10. A power transmitting mechanism comprising, a pair of relatively rotatable shaft elements aligned on a common axis, a pair of sun gears non-rotatably secured, respectively, to said shaft elements, means including an annular planet carrier mounting main planet pinion means in mesh with said sun gears, for differentially connecting said shaft elements with each other, main driving means for rotating said planet carrier, auxiliary first and second planet pinion means journaled, respectively, on said sun gears, first and second auxiliary sun gears aligned on said axis in rotatively loose relation to said planet carrier and shaft elements and in mesh, respectively, with said first and second auxiliary planet pinion means, means mounting one of said auxiliary sun gears in rotatable relation to the other, means for restraining said other auxiliary sun gear against rotation, auxiliary driving means for rotating said one auxiliary sun gear, and a sleeve gear inside of said annular planet carrier mounted coaxially with said shaft elements for rotation relative thereto and relative to said annular planet carrier and having first and second gear sections in mesh, respectively, with said first and second auxiliary pinion means.

11. A mechanism for driving a pair of relatively rotatable shaft elements, comprising a differential mechanism operatively interposed between said shaft elements, a rotatable main drive element connected in driving relation with the spider element of said differential mechanism, first and second auxiliary sun gears each mounted for rotation relative to the other in rotatively loose relation to said spider and shaft elements, first and second planetary pinion means in cooperative engagement, respectively, with said first and second sun gears and connected, respectively, with said shaft elements for orbital movement by the latter about said first and second sun gears, a rotatable torque transmitting element mounted in rotatively loose relation to said spider element, shaft elements and auxiliary sun gears and operatively connected with both of said planetary pinion means, an auxiliary rotatable drive element, first control means operable to selectively connect one or the other of said auxiliary sun gears in driven relation with said auxiliary drive element, and second control means operable to selectively restrain rotation of one or the other of said auxiliary sun gears.

12. A mechanism as set forth in claim 11, in which said first control means are selectively operable to establish a driving connection between said auxiliary drive element and said first auxiliary sun gear, or between said auxiliary drive element and said second auxiliary sun gear, or to establish a non-driving relation between said auxiliary drive element and both of said auxiliary sun gears, and in which said second control means are selectively operable to restrain rotation of said first auxiliary sun gear while said first control means are operative to connect said second auxiliary sun gear in driven relation with said auxiliary drive element, or to restrain rotation of said second auxiliary sun gear while said first control means are operative to connect said first auxiliary sun gear in driven relation with said auxiliary drive element.

13. A mechanism as set forth in claim 11, in which said first control means are selectively operable to establish a driving connection between said auxiliary drive element and said first auxiliary sun gear, or between said auxiliary drive element and said second auxiliary sun gear, or to establish a non-driving relation between said auxiliary drive element and both of said auxiliary sun gears, in which said second control means are selectively operable to restrain rotation of one or the other or both of said auxiliary sun gears, and in which said first and second control means are so interrelated that said second control means will restrain rotation of both of said auxiliary sun gears while said first control means are operative to establish said non-driving relation between said auxiliary drive element and said auxiliary sun gears.

14. A steering differential for motor vehicles comprising, in combination, a pair of differentially interconnected shafts, a rotatable auxiliary sun gear, another auxiliary sun gear, torque transmitting means operative to resist rotation of said other sun gear, first and second auxiliary planetary pinion means, a carrier connected with one of said shafts for rotation thereby and operatively mounting said first auxiliary planetary pinion means in mesh with one of said auxiliary sun gears, another carrier connected with the other of said shafts and operatively mounting said second auxiliary planetary pinion means in mesh with the other of said auxiliary sun gears, and counter gear elements in mesh, respectively, with said first and second planetary pinion means and connected in torque transmitting relation with each other.

15. A steering differential for motor vehicles comprising, in combination, a rotary cage structure, a pair of main sun gears and main planet pinions in mesh with said sun gears, rotatably mounted on said cage structure, a pair of auxiliary sun gears mounted coaxially with said cage structure for rotation of the latter and of said main sun gears relative thereto, first auxiliary planet pinions mounted on one of said main sun gears and meshing with one of said auxiliary sun gears, second auxiliary planet pinions mounted on the other of said main sun gears and meshing with the other of said auxiliary sun gears, and an annular gear element mounted coaxially with said cage structure for rotation of the latter and of said main sun gears relative thereto and in rotatable relation to said auxiliary sun gears, said annular gear element having two circumferential series of teeth in mesh, respectively, with said first and second auxiliary planet pinions.

16. A steering differential for motor vehicles comprising, in combination, a rotary cage structure having axially opposite head sections, a pair of axially spaced main sun gears rotatable within said cage structure about the axis of the latter, main planet pinions mounted on said cage structure in cooperative engagement with said main sun gears, first auxiliary planet pinions mounted on one of said main sun gears for rotation therewith within said cage structure about the axis of the latter, second auxiliary planet pinions mounted on the other of said main sun gears for rotation therewith within said cage structure about the axis of the latter, a pair of auxiliary sun gears in mesh, respectively, with said first and second auxiliary planet pinions, tubular supporting shafts for said auxiliary sun gears, respectively, one extending axially through one of said head sections and the other extending axially through the other of said head sections, an annular rotatable gear element within said cage structure having axially opposite gear sections in meshed relation, respectively, with said first and second auxiliary planet pinions, and a pair of driven shafts extending axially through said tubular shafts and nonrotatably connected, respectively, at their relatively adjacent ends with said main sun gears.

17. A steering differential as set forth in claim 16, in which said first auxiliary planet pinions are mounted on and located at the axially inner side of one of said main sun gears, in which said second auxiliary planet pinions are mounted on and located at the axially inner side of the other of said main sun gears, and in which said tubular supporting shafts for said auxiliary sun gears extend through central apertures of said main sun gears, respectively.

18. A steering differential as set forth in claim 16, in which said cage structure comprises a drum section and a pair of head sections detachably secured to said drum section at the axially opposite ends, respectively, of the latter; in which an annular carrier for said main planet pinions comprises a ring section and trunnions extending radially outwardly from said ring sections; and in which cover plates mounting said trunnions are detachably secured to said drum section over circumferentially spaced apertures of the latter.

19. A steering differential as set forth in claim 16, in which each of said main sun gears comprises a disk section having a peripheral axially extending rim portion, and a ring gear section having an axial spline connection with said rim portion of said disk section.

20. A power steering mechanism for motor vehicles comprising, in combination, a pair of relatively rotatable shafts, main sun gears secured, respectively, to said shafts, a rotatable main planet carrier, main planet pinion means rotatably mounted on said main planet carrier and connecting said main sun gears in torque transmitting relation with each other; a spider, an auxiliary sun gear and a counter gear forming three relatively rotatable elements of a first epicyclic gearing and being operatively interconnected by planet pinion means on said spider; another spider, auxiliary sun gear and counter gear forming three relatively rotatable elements of a second epicyclic gearing and being operatively interconnected by planet pinion means on said other spider; means connecting a first of said elements of said first gearing, independently of the second and third elements of said first gearing and independently of said second gearing and of said main planet pinion means, in power transmitting relation with one of said shafts; means connecting a first of said elements of said second gearing, independently of the second and third elements of said second gearing and independently of said first gearing and of said main planet pinion means, in power transmitting relation with the other of said shafts; rotatable torque transmitting means in rotatively loose relation to said main planet carrier and operatively connecting said second element of said first gearing with said second element of said second gearing, independently of said first and third elements of each of said epicyclic gearings, main driving means connected in driving relation with said main planet carrier, auxiliary driving means connected in driving relation with the third element of one of said epicyclic gearings, and means for restraining rotation of the third element of the other of said epicyclic gearings.

21. A power steering mechanism as set forth in claim 20, in which the sun gear, counter gear and planet pinion means of said first epicyclic gearing are relatively proportioned, and the sun gear, counter gear and planet pinion means of said second epicyclic gearing are relatively proportioned so that the gear ratio between said first and second elements of said first gearing, at zero speed of its third element, is substantially equal to the gear ratio between said first and second elements of said second gearing at zero speed of the third element of said second gearing.

22. A power steering mechanism as set forth in claim 20, in which the sun gear, counter gear and planet pinion means of said first epicyclic gear train are relatively proportioned, and the sun gear, counter gear and planet pinion means of said second epicyclic gear train are relatively proportioned, so that the gear ratio between said first and second elements of said first gearing, at zero speed of its third element, is substantially equal to the gear ratio between said first and second elements of said second gearing at zero speed of the third element of said second gearing, and so that the gear ratio between said first and third elements of said first gearing, at zero speed of its second element, is substantially equal to the gear ratio between said first and third elements of said second gearing at zero speed of the second element of said second gearing.

23. A power steering mechanism for motor vehicles comprising, in combination, a pair of relatively rotatable shafts, main sun gears secured, respectively, to said shafts, a rotatable main planet carrier, main planet pinion means rotatably mounted on said main planet carrier and connecting said main sun gears in torque transmitting relation with each other; a spider, an auxiliary sun gear and a counter gear forming three relatively rotatable elements of a first epicyclic gearing and being operatively interconnected by planet pinion means on said spider; another spider, auxiliary sun gear and counter gear forming three relatively rotatable elements of a second epicyclic gearing and being operatively interconnected by planet pinion means on said other spider; means connecting said spider of said first gearing independently of said sun and counter gears of said first gearing and independently of said second gearing and of said main planet pinion means, in power transmitting relation with one of said shafts; means connecting said spider of said second gearing, independently of said sun and counter gears of said second gearing and independently of said first gearing and of said main planet pinion means in power transmitting relation with the other of said shafts; rotatable torque transmitting means in rotatively loose relation to said main planet carrier and operatively connecting said counter gear of said first gearing with said counter gear of said second gearing, independently of said sun gear and spider of each of said epicyclic gearings, main driving means connected in driving relation with said main planet carrier, auxiliary driving means connected in driving relation with said sun gear of one of said epicyclic gear gearings, and means for restraining rotation of said sun gear of the other of said epicyclic gearings.

24. A power steering mechanism as set forth in claim 23, in which the sun gear of said first epicyclic gearing has a smaller pitch diameter than the counter gear of said first epicyclic gearing, and in which the sun gear of said second epicyclic gearing has a smaller pitch diameter than the counter gear of said second epicyclic gearing.

25. A power steering mechanism as set forth in claim 24, in which the pitch diameter of the sun gear of said first epicyclic gearing is equal to the pitch diameter of said sun gear of said second epicyclic gearing, and in which the pitch diameter of the counter gear of said first epicyclic gearing is equal to the pitch diameter of the counter gear of said second epicyclic gearing.

EMIL F. NORELIUS.

REFERENCES CITED

The following references are of record in the file of this patent:

UNITED STATES PATENTS

| Number | Name | Date |
| --- | --- | --- |
| 1,247,725 | Schneider | Nov. 27, 1917 |
| 1,317,075 | Cause | Sept. 23, 1919 |
| 1,401,221 | White | Dec. 27, 1921 |
| 2,196,368 | Thomson | Apr. 9, 1940 |
| 2,332,838 | Borgward | Oct. 26, 1943 |

FOREIGN PATENTS

| Number | Country | Date |
| --- | --- | --- |
| 357,807 | Italy | Mar. 28, 1938 |